US011003661B2

(12) United States Patent
Taylor et al.

(10) Patent No.: US 11,003,661 B2
(45) Date of Patent: May 11, 2021

(54) SYSTEM FOR RAPID INGESTION, SEMANTIC MODELING AND SEMANTIC QUERYING OVER COMPUTER CLUSTERS

(71) Applicant: InfoTech Soft, inc., Miami, FL (US)

(72) Inventors: Thomas J. Taylor, Miami, FL (US); Emilio Patrick Shironoshita, Miami, FL (US)

(73) Assignee: InfoTech Soft, Inc., Miami, FL (US)

( * ) Notice: Subject to any disclaimer, the term of this patent is extended or adjusted under 35 U.S.C. 154(b) by 76 days.

(21) Appl. No.: 16/554,265

(22) Filed: Aug. 28, 2019

(65) Prior Publication Data

US 2019/0391977 A1 Dec. 26, 2019

Related U.S. Application Data

(63) Continuation-in-part of application No. 14/952,569, filed on Nov. 25, 2015, now abandoned, which is a continuation-in-part of application No. 14/846,729, filed on Sep. 4, 2015, now abandoned.

(51) Int. Cl.
*G06F 16/2453* (2019.01)
*G06F 16/2455* (2019.01)

(52) U.S. Cl.
CPC .. *G06F 16/24542* (2019.01); *G06F 16/24556* (2019.01)

(58) Field of Classification Search
CPC ..................... G06F 16/24542; G06F 16/24556
USPC .......................................................... 707/708
See application file for complete search history.

(56) References Cited

U.S. PATENT DOCUMENTS

| | | | | |
|---|---|---|---|---|
| 7,921,098 B2 * | 4/2011 | Edelstein | G06F 16/25 707/708 |
| 8,037,108 B1 * | 10/2011 | Chang | G06F 16/214 707/803 |
| 9,760,345 B2 * | 9/2017 | Diez | G06F 16/367 |
| 2006/0053174 A1 * | 3/2006 | Gardner | G06F 16/353 |

(Continued)

OTHER PUBLICATIONS

Bodenreider, Olivier, and Bastien Rance, eds. Data Integration in the Life Sciences: 8th International Conference, DILS 2012, College Park, MD, USA, Jun. 28-29, 2012, Proceedings. vol. 7348. Springer, 2012. (Year: 2012).*

(Continued)

*Primary Examiner* — Mohsen Almani
(74) *Attorney, Agent, or Firm* — Mark Terry

(57) ABSTRACT

A computer-implemented system within a computational cluster for aggregating data from a plurality of heterogeneous data sets into a homogeneous representation within a distributed, fault tolerant data source for the subsequent high-throughput retrieval, integration, and analysis of constituent data regardless of original data source location, data source format, and data encoding is configured for reading an input data set, generating a source data model based on the input data set, generating a vocabulary annotation and a profile of said source data model, executing semantic processing on said source data model so as to produce a normalized model based on standard ontology axioms and expanding the normalized model to identify and make explicit all implicit ontology axioms, and executing semantic querying on said data model using parallelized ontology reasoning based on an Enhance Most-Specific-Concept (MSC) algorithm.

13 Claims, 5 Drawing Sheets

(56) References Cited

U.S. PATENT DOCUMENTS

| | | | | |
|---|---|---|---|---|
| 2008/0126399 | A1* | 5/2008 | MacGregor | G06F 16/30 |
| 2012/0310916 | A1* | 12/2012 | Abadi | G06F 16/24542 707/713 |
| 2013/0173643 | A1* | 7/2013 | Ezzat | G06Q 30/06 707/756 |
| 2014/0304251 | A1* | 10/2014 | Bornea | G06F 16/24542 707/718 |
| 2017/0017715 | A1* | 1/2017 | Wroblewski | G06F 16/316 |

OTHER PUBLICATIONS

Kirrane S. Linked data with access control. InWorkshop on. pp. Jan. 29, 2015 (vol. 14, p. 23). (Year: 2015).*

Shironoshita EP, Jean-Mary YR, Bradley RM, Kabuka MR. semCDI: a query formulation for semantic data integration in caBIG. Journal of the American Medical Informatics Association. Jul. 1, 2008;15(4):559-68. (Year: 2008).*

Xu, Zhuoming, Shichao Zhang, and Yisheng Dong. "Mapping between relational database schema and OWL ontology for deep annotation." 2006 IEEE/WIC/ACM International Conference on Web Intelligence (WI 2006 Main Conference Proceedings)(WI'06). IEEE, 2006. (Year: 2006).*

Das S, Srinivasan J, Perry M, Chong El, Banerjee J. A Tale of Two Graphs: Property Graphs as RDF in Oracle. InEDBT Mar. 24, 2014 (pp. 762-773). (Year: 2014).*

Sun J, Jin Q. Scalable rdf store based on hbase and mapreduce. In2010 3rd international conference on advanced computer theory and engineering (ICACTE) Aug. 20, 2010 (vol. 1, pp. V1-633). IEEE. (Year: 2010).*

Shironoshita EP, Jean-Mary YR, Bradley RM, Kabuka MR. semQA: SPARQL with Idempotent Disjunction. IEEE transactions on knowledge and data engineering. May 12, 2008;21(3):401-14. (Year: 2008).*

Cudre-Mauroux P, Enchev I, Fundatureanu S, Groth P, Haque A, Harth A, Keppmann FL, Miranker D, Sequeda JF, Wylot M. NoSQL databases for RDF: an empirical evaluation. InInternational Semantic Web Conference Oct. 21, 2013 (pp. 310-325). Springer , Berlin, Heidelberg. (Year: 2013).*

Fundatureanu, Sever, and Second Reader Jacopo Urbani. A scalable RDF store based on HBASE. Diss. Master's thesis, Vrije University, 2012. (Year: 2012).*

* cited by examiner

SYSTEM FOR RAPID INGESTION, SEMANTIC MODELING AND SEMANTIC QUERYING OVER COMPUTER CLUSTERS

CROSS-REFERENCE TO RELATED APPLICATIONS

This patent application is a continuation in part of patent application Ser. No. 14/952,569 filed Nov. 25, 2015 and titled "System for Rapid Ingestion, Semantic Modeling and Semantic Querying Over Computer Clusters," which is a continuation in part of patent application Ser. No. 14/846,729 filed Sep. 4, 2015 and titled "System for Rapid Ingestion, Semantic Modeling and Semantic Querying Over Computer Clusters." The subject matter of patent application Ser. Nos. 14/952,569 and 14/846,729 are hereby incorporated by reference in its entirety.

STATEMENT REGARDING FEDERALLY SPONSORED RESEARCH OR DEVELOPMENT

This invention was made with government support under grant number R44GM097851 awarded by the National Institutes of Health (NIH). The government has certain rights in the invention.

INCORPORATION BY REFERENCE OF MATERIAL SUBMITTED ON A COMPACT DISC

Not Applicable.

TECHNICAL FIELD

The disclosed embodiments relate to the field of information science and, more specifically, the disclosed embodiments relate to the field of data integration and analysis.

BACKGROUND

The practice of conducting scientific research today requires the ingestion, modeling and querying of extremely large knowledge bases that cover a variety of disciplines. When dealing with areas of research that span multiple domains, such as biomedical research, explorations may require consultation in a variety of different areas of research that may contain terabytes, petabytes or exabytes of data. Consider, for example, the case of a researcher wishing to research the fusion gene TMPRSS2-ERG and its association with hydrolase activity. Before any research can be performed on this topic, there must exist a data store wherein enormous knowledge bases covering multiple disciplines have been integrated, modelled and prepared for querying. This task, on its own, can be an extremely difficult and complicated assignment involving thousands of man hours and large numbers of computers. Assuming said data store can even be created, in order to research this topic, the researcher would be required to perform multiple consultations within a variety of different knowledge bases involving biomedical research. This increases the complexity of the inquiry, as well the time required to execute it.

Therefore, what is needed is a system and method for addressing the problems with the prior art, and more particularly for a more efficient and user-friendly way for ingesting large amounts of data, modeling said data and then querying said data.

SUMMARY

A system and method for ingesting and analyzing large amounts of data is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The disclosed embodiments address deficiencies of the art in respect to information science and the integration of large knowledge bases. In one embodiment, a system comprising a cluster of computers for ingesting and analyzing a plurality of data sets that together comprise of at least one million data points or at least one gigabyte is disclosed. The system being configured for reading an input data set from the plurality of data sets, wherein the input data sets comprise fields and field values, storing the input data set in a data store, generating a source data model based on the input data set, generating a semantic annotation for said source data model and generating a profile of said source data model, wherein a profile defines a range of values for data elements in a data model, executing semantic processing on one or more data models including said source data model, so as to produce a target data model, said semantic processing including: 1) executing semantic integration of said one or more data models, using an ontology alignment algorithm, and constructing said target data model based on said ontology alignment algorithm, and 2) defining a transformation from the one or more data models to said target data model, executing said transformation on one or more data sets in the one or more data models so as to populate said target data model with a transformed data set, storing said transformed data set in the data store, and executing semantic querying on said target data model, using an ontology defined by said target model and using parallelized ontology reasoning.

Additional aspects of the disclosed embodiments will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate different embodiments and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
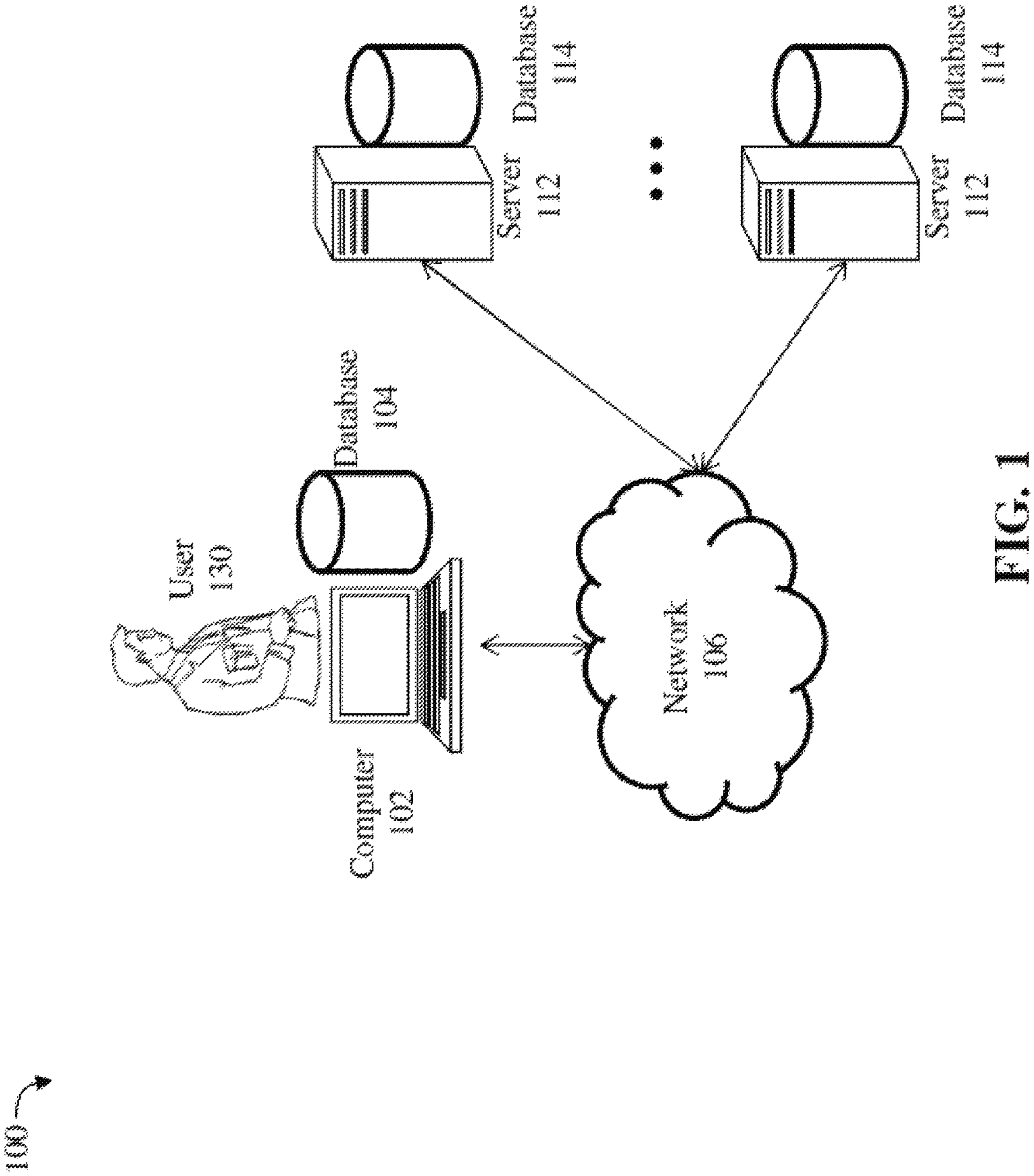
FIG. 1 is a block diagram illustrating the network architecture of a system for ingesting and analyzing large amounts of data, over a communications network, in accordance with one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an efficient and user-friendly way for facilitating the ingestion, modeling and querying of large knowledge bases. One of the advantages of the disclosed embodiments is that it allows for the rapid ingestion and querying of large amounts of data sets (i.e., one million data points, one gigabyte, or larger) from a variety of different disciplines (relational databases, files, Web Service APIs). Another advantage of the disclosed embodiments is that it allows for a variety of different knowledge bases to remain in their respective locations, while allowing a cluster of computer to access said bases in an automated fashion. Another advantage of the disclosed embodiments is that it allows a researcher to perform multiple consultations regarding certain subject matter within a variety of different knowledge bases at once and in an automated manner. Further, the disclosed embodiments reduces the time required to ingest, model and query large knowledge bases.

Referring now to the drawing figures in which like reference designators refer to like elements, there is shown in FIG. 1 a block diagram illustrating the network architecture of a system 100 for ingesting and analyzing large amounts of data, over a communications network, in accordance with one embodiment. A large data store (for ingesting and analyzing) or a large group of data sets is defined as one million data points, one gigabyte, or larger. One gigabyte as a size of a data store or data sets is significant because, on average, the minimum size of a data store or data sets for an area of research is about one million data points or one gigabyte in size. Thus, the disclosed embodiments are configured for quickly and easily reading, organizing, storing, analyzing and querying a data store or data sets of at least one million data points or more than one gigabyte in size. This amount of data is also significant because currently the cost of storage (i.e., nonvolatile memory) is about $0.05 per gigabyte, which makes the cost of one gigabyte highly affordable to purchase, even in large quantities. This amount of data is also significant because currently the cost of memory (i.e., RAM) is about $5.00 per gigabyte, which makes the cost of one gigabyte highly affordable to purchase, even in large quantities.

The system 100 provides a collaborative environment for data integration and analysis built on a cluster computing infrastructure. A computer cluster consists of a set of loosely or tightly connected computers that work together so that, in many respects, they can be viewed as a single system. Computer clusters can have each node set to perform the same task, controlled and scheduled by software. FIG. 1 shows computer 102 associated with a data repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, a WAN, a LAN, or any combination of the above. Computer 102 may be a desktop, workstation, server computer, web server, or a mobile computing device, such as a smart phone, mobile phone, tablet computer, handheld computer, laptop, or the like. Database 104 may store one or more knowledge bases, data sets, data models, ontologies, premise axioms and hypotheses. Computer 102 corresponds to an administrator 130, who may perform tasks on computer 102 that effectuate the methods of the disclosed embodiments.

FIG. 1 further includes one or more servers 112, which may be desktops, workstations, server computers, or mobile computing devices. Each server 112 is associated with a database 114 and each server 112 is connected to the network 106. The database 104, as well as any of the databases 114, may, for example, be a relational database comprising a Structured Query Language (SQL) database stored in a SQL server. The database 104, as well as any of the databases 114, may be distributed over one or more nodes or locations that are connected via network 106. The one or more servers 112 may be referred to as a cluster of computers. As explained above, a computer cluster consists of a set of connected computers that work together so that they can be viewed as a single system. In one embodiment, computer clusters may have each node set to perform the same task, controlled and scheduled by software.

In an embodiment where a distributed storage and computing framework is used, said system provides capabilities to store massive amounts of data within said cluster computers (i.e., gigabytes, terabytes, petabytes or exabytes of data), and to perform computations that can be done in parallel over the cluster infrastructure. In some embodiments, said distributed storage and computing are created using the Apache Hadoop system, and the Apache Hadoop Distributed File System (HDFS) for storage. In some embodiments, Apache Spark, an in-memory cluster computing framework, is deployed over Apache Hadoop to provide additional performance. The software programs for the system may be designed to be deployed either over Apache Hadoop or over Apache Spark. In said system, a tabular data store may be used for data extracted from SQL data sources and tabular files, and a graph data store may be used for data organized as graphs or trees, including XML and RDF data. A graph data store is a database that uses graph structures for semantic queries with nodes, edges and properties to represent and store data. The graph data store may also be used as a storage location for ontologies and controlled vocabularies that may be used within the system. In some embodiments, the tabular data store is deployed over a key-value pair store, for example Apache Accumulo. In some embodiments, the graph data store is deployed over a graph database interface, for example Titan DB.

FIG. 1 shows an embodiment wherein networked computers 112 interact with computer 102 over the network 106.

Servers 112 may include a software engine that delivers applications, data, program code and other information to other computing devices, such as computer 102, via the network 106. It should be noted that although FIG. 1 shows only one computer 102 and one database 104, the system of the disclosed embodiments supports any number of computers and databases connected via network 106. Further, the system of the disclosed embodiments supports any number of servers 112 and associated databases connected via network 106. Computer 102 and servers 112 include program logic comprising computer source code, scripting language code or interpreted language code that may be compiled to produce an executable file or computer instructions, or that may be interpreted at run-time, wherein the computer source code performs various functions of the disclosed embodiments.

Note that although computer 102 and servers 112 are each shown as a single and independent entity, in one embodiment, the functions of computer 102 and/or any of the servers 112 may be integrated with another entity. Further, computer 102 and/or any of the servers 112 and their functionality, according to a preferred embodiment, can be realized in a centralized fashion in one computer system or in a distributed fashion wherein different elements are spread across several interconnected computer systems.

Database 104 of any of the databases 114 may be used to store a variety of data elements including facts, knowledge bases, data sets, data models, ontologies, premise axioms and hypotheses. An ontology is a form of knowledge representation about the world or some part of it. An ontology formally represents knowledge as a set of concepts within a domain, and the relationships between pairs of concepts. The utility of an ontology is that it provides a shared vocabulary, which can be used to model a domain, that is, the type of objects and/or concepts that exist, and their properties and relations.

Ontologies take advantage of description logic (DL)-based formalisms to represent knowledge. Description logic is a family of formal knowledge representation languages and provides a logical formalism for ontologies. Description logic provides a strong mathematical underpinning for ontologies conceptualized in this way, where expressivity of ontologies is defined based upon the types of axioms allowed. Description logic also defines reasoning or inferencing capabilities over ontologies, whereby axioms not explicitly asserted can be inferred based on logical consequences.

Figure 2:
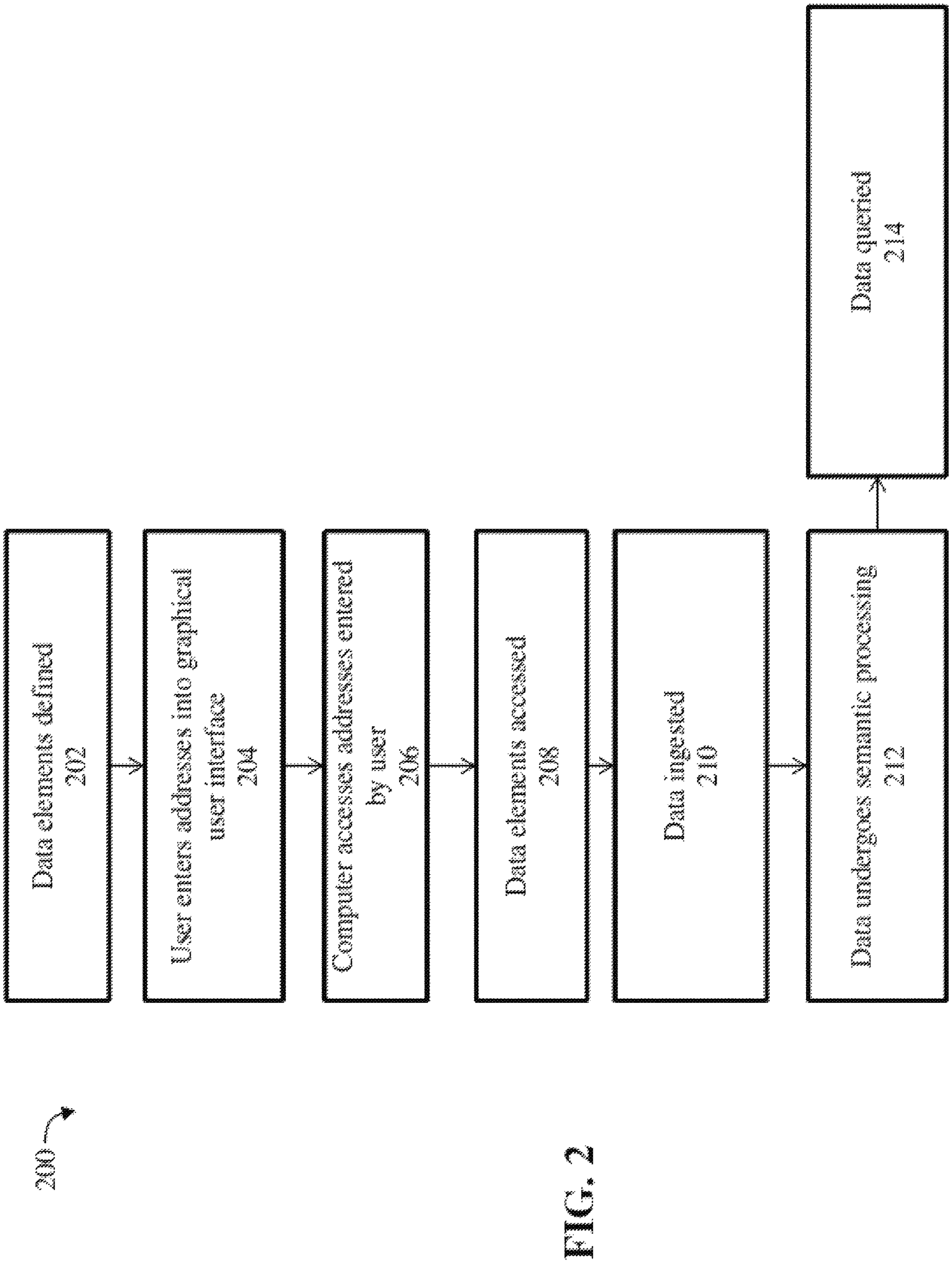
FIG. 2 is a flow chart depicting the general control flow of a process for ingesting and analyzing large amounts of data, over a communications network, according to one embodiment.
Figure 3A:
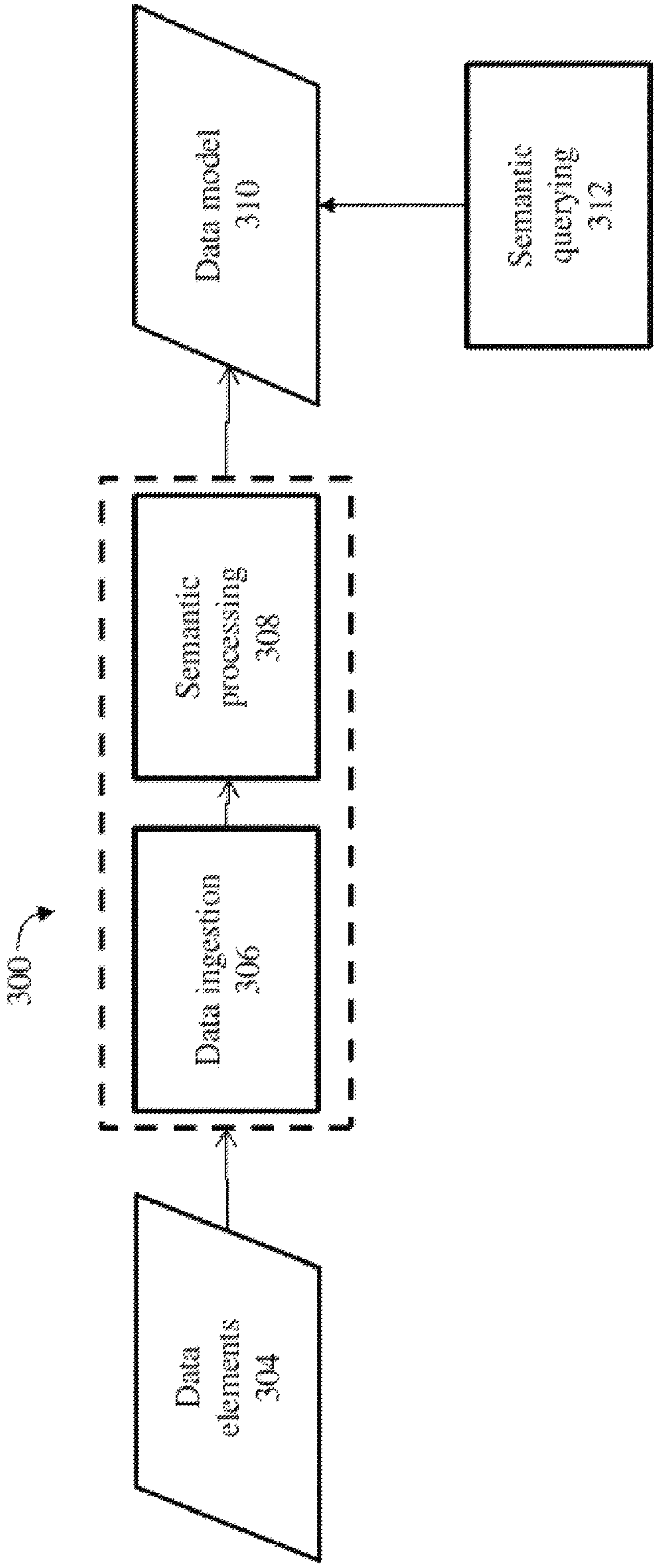
FIG. 3A is a block diagram depicting the general data flow of a process for ingesting and analyzing large amounts of data, over a communications network, according to one embodiment.

FIG. 2 is a flow chart depicting the general control flow of a process for ingesting and analyzing large amounts of data, over a communications network, according to one embodiment. FIG. 2 will be described with reference to FIG. 3A.

The process 200 begins with step 202 wherein one or more data elements 304 (otherwise known as data sets), have been defined and stored in a location in database 104 or any of the databases 114. Each of the stored data elements 304 have an address, such as a network address, a URL, a file path, a directory path, IP address, MAC address, host address or the like, which specifies a unique location of the data element that may be accessible via network 106. Each entity within a data set—a table row, file line, XML element, or logical entity—is assigned a unique entity identifier based on the data set's uniform resource locator (URL) and its identification within the data set—table and row key, line number, XML path, or file position (row, column). Note that each data element (such as data sets, data models, ontology axioms, hypothesis axioms and premise axioms) may be represented in description logic form or in OWL 2 format, for example. In one alternative, certain data elements are stored in memory (such as RAM), in which case they are not stored in databases 104, 114. In said embodiment, the address of the data elements is the address of the data elements in memory.

In step 204, the user 130 enters into a graphical user interface the address for the one or more data elements. In step 206, the computer 102 reads, from the graphical user interface, the addresses that were entered by a user 130. In step 208, the computer 102 accesses the one or more data elements using the addresses that were read. Note that the addresses that were read may indicate locations in remote databases accessible over the network 106. Thus, in step 208, the computer 102 may access the data elements over the network 106 using the addresses that were read. In step 210, the data elements are ingested (step 306), as described in greater detail below, with reference to FIG. 3B. In step 212, the data elements undergo semantic processing (step 308), as described in greater detail below. The combination of steps 306 and 308 are referred to collectively as process 300. In step 214, the resulting data models 310 are queried (step 312), as described in greater detail below.

Figure 3B:
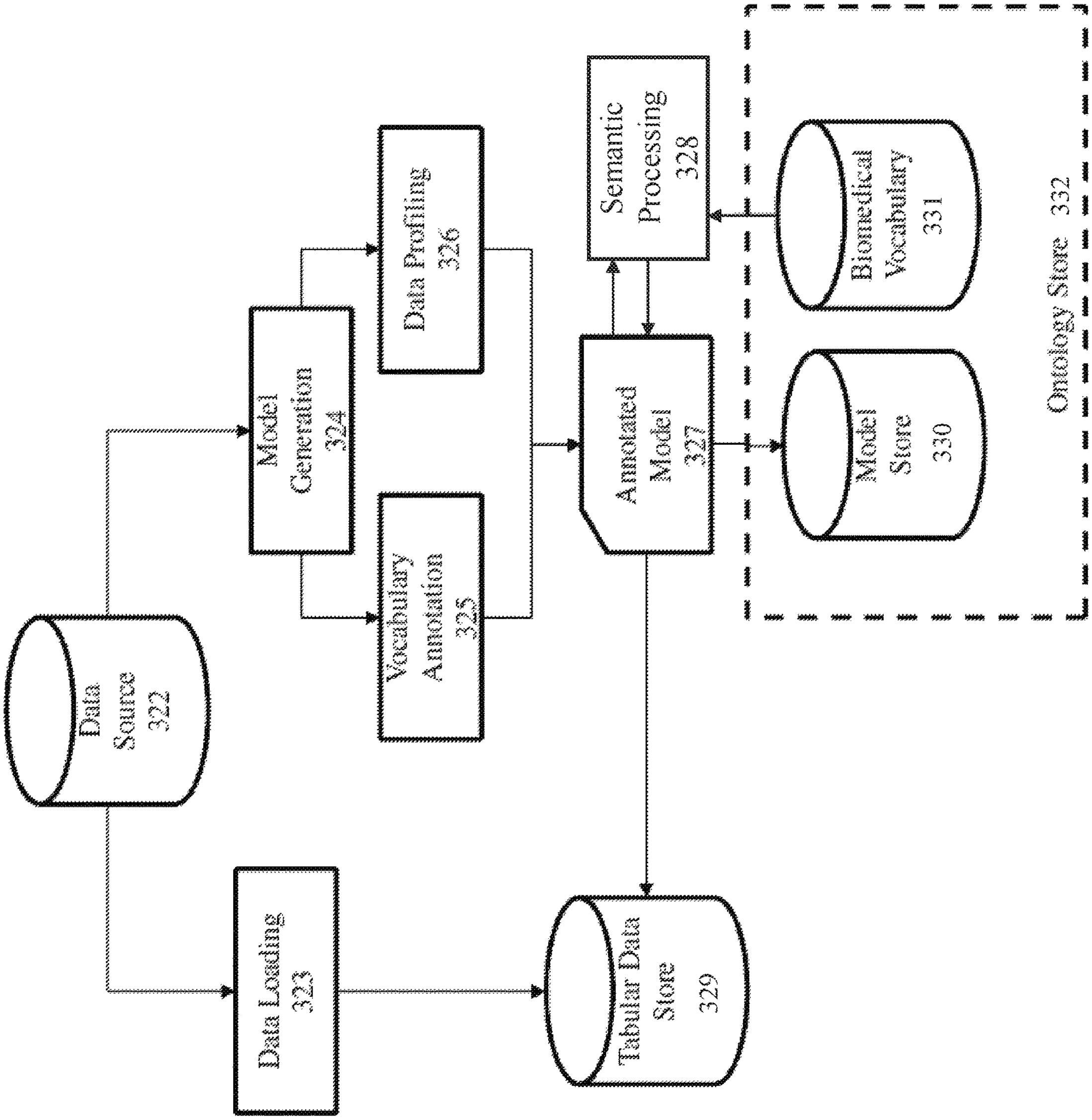
FIG. 3B is a block diagram depicting the general data flow of the data ingestion subprocess, over a communications network, according to one embodiment.

FIG. 3B is a block diagram depicting the general data flow of the data ingestion subprocess, over a communications network, according to one embodiment. The disclosed system provides mechanisms necessary for the rapid, automatic ingestion of data sets of multiple different types, which collectively have a size of at least one million data items or one gigabyte for data. The data ingestion process loads this data into the distributed storage and automatically generates representations of this data from the metadata given, with minimal conversions, in keeping with the goal of rapid incorporation of data for increased availability. The size of at least one million data items or at least one gigabyte is significant because the ontologies that today's academic research requires have at least said size. Therefore, in order to process the necessary data to research today's ontologies, Applicant's claimed invention must at least be able to handle said sizes.

The data ingestion process, consists generally of the following processes: data loading 323, model generation 324, vocabulary annotation 325, and semantic processing 328, as described in the following. With regard to model generation 324, data models of the available semantics intrinsic to data sources (or input data sets) 322 being loaded are automatically created by the system. These models follow the semCDI formulation first discussed in the Shironoshita reference (E. P. Shironoshita, Y. R. Jean-Mary, R. M. Bradley, and M. R. Kabuka, "semCDI: a query formulation for semantic data integration in caBIG," *J Am Med Inform Assoc*, vol. 15, no. 4, pp. 559-568, August 2008), and subsequently implemented in the GeneTegra reference (E. P. Shironoshita, Y. R. Jean-Mary, R. M. Bradley, P. Buendia, and M. R. Kabuka, "Cancer Data Integration and Querying with GeneTegra," in *Data Integration in the Life Sciences*, O. Bodenreider and B. Rance, Eds. Springer Berlin Heidelberg, 2012, pp. 56-70.), where classes, object properties, and data properties are created as summarized in Table 1 below. Thus, Table 1 below defines the types of data that may be present in a data set that is modeled by a data model. Each class and property in the data model also preserves mapping information that points to the proper location within the tabular data store 329 where the actual data is to be retrieved.

TABLE 1

| Mechanisms for intrinsic semantics extraction | | |
|---|---|---|
| | Relational dB | XML with Schema |
| Classes | Tables, closed value domains, value domain values | Complex types, enumerated simple types, enumerated values |
| Subclass relationships | Value domain values to value domains | Derived types: Enumerated values to enumerated simple types. |
| Object properties | Key relationships between tables. Tables to closed value domains. | Parent-child relationships between elements. Key relationships between elements. Complex types to enumerated types. |
| Datatype properties | Tables to field values. | XML attributes and element content; |

Moreover, the data model originally implemented in GeneTegra has also been improved in its representation of closed value domains. These are now represented by ontology classes whose subclasses denote the range of possible values. This is illustrated in an example whereby a "gender" column in a table holding data for a medical patient can only adopt two possible values (such as the binary 1 or 0), and is therefore translated into a class with two subclasses. This enhanced representation enables the mapping of these values across multiple sources.

Note, however, that in the case of relational data or structured text, value domain information is typically not coded in a database schema or structured text file. In some embodiments, the system gives the option of providing a data dictionary (such as biomedical vocabulary 331, for example), whose information will be employed to enhance the information provided to the semantic data model, thereby generating an annotated data model 327, which may be stored in the data model store 330. This information can come in any mechanism that links table fields from SQL databases or columns from structured text files to a common data element (CDE), defined as a specification of a named value domain and a list of its permissible values. In some embodiments, common data elements are provided using the IEC 11579 standard. In some embodiments, the CDE and/or its list of values are also linked to another standardized vocabulary such as the Unified Medical Language System (UMLS) in the ontology store 332. Labels and descriptions of different data fields will be taken from the data dictionary and included within the data model, thereby generating an annotated data model. Value domains and their permissible values will also be taken from the dictionary and codified automatically, ensuring that the intended intrinsic meaning of the input data is preserved.

A data model is a representative of the structure of certain data using those methods above, i.e., methods that create classes to represent tables in the data, object properties (which define a relation between two objects) from key relationships, and data type properties (which relate an object with a data value) from table field values. A data set may be defined as a collection of data points, and may comprise tables in a relational database, collections within a key-value store, and file-based data in structured query language (SQL) format, delimiter-separated value (DSV) format, comma-separated value (CSV) format, extensible markup language (XML) data, resource description framework (RDF) data, javascript object notation (JSON) data, YAML ain't markup language (YAML) format, Excel format, SAS format, SPSS format, investigation-study-assay tab-separated (ISATab) format, NetCDF format, ASCII format, or in any other format recognized by the system. A data set may further be contained within a compressed or uncompressed archive, including TAR, GZIP, ZIP, and TAR-GZIP. A data set may also include fields, field values, tables and key relationships (which may be a link between two tables, wherein one table make a references to a key of another table). An input data set may be used to generate a source data model, which is used to generate other data models, such as a target data model generated from effectuating a transformation on a source data model. The resulting data in a target data model is a target data set. A transformation is a function that maps data points from one set to another, or that converts a set of data values from the data format of a source data system into the data format of a destination data system. Data mapping maps data elements from the source data system to the destination data system and captures any transformation that must occur. In the disclosed embodiments, a transformation is used to populate a target data model and generate a target data set by combining the input data sets defined by the input data models.

An input data set (or a target data set, transformed data set) may be ingested into a data store. A data store is a repository of a set of data objects. These objects are modelled using classes defined in a database schema. A data store is a general concept that includes not just repositories like databases, but also simpler store types such as flat files.

With regard to data profiling 326, in some cases, initial ingestion of data into the system does not provide sufficient semantic information, especially if a data dictionary is not provided. To prepare ingested data for further semantic processing, the data profiling component 326 analyzes the contents to determine basic characteristics, including numeric vs alphanumeric data, basic statistics for numeric ranges, and analysis of the data to establish if it contains a closed value domain, that is, a finite set of possible values. The derived characteristics are added to the model of the ingested data.

With regard to vocabulary annotation 325, a vocabulary annotation component provides the ability to probabilistically link lexical entities in the data models to terms within a global vocabulary maintained by the system. In some embodiments, the Unified Medical Language System (UMLS) (a compendium of many controlled vocabularies in the biomedical sciences) or some subset of it is used as the global vocabulary. Vocabulary annotation is concerned only with linking an individual lexical entity to its most likely equivalent terms in a vocabulary, and is not concerned with semantic consistency between entities, which may be the focus of other processes such as ontology alignment and mapping to an upper ontology. Let the two labels being compared be $l_d$ and $l_v$, belonging respectively to entities (classes or properties) $e_d$ in the data model and $e_v$ in the vocabulary. A tokenization function tok(1) is used to extract a set of tokens from the label 1 by dividing text at punctuation, blank spaces, and uppercase changes. For example, tok("Process for Analyzing MetaData.") results in the five tokens ["process", "for", "analyzing", "meta", "data"]. Tokens are then expanded to include word stemming, a process to reduce the reduce the token to its root form, for example reducing the token "analyzing" to its root form "analyze". Tokens are additionally expanded to include stop word removal, which involves removing the most common words in a language, such as "the", "and", and "for", resulting in ["process", "analyze", "meta", "data"]. The lexical similarity for each token set is computed as the number of overlapping tokens, $s^l(e_d, e_v)=\Sigma(tok(l_d) \cap tok(l_v))/\Sigma(tok(l_d) \cup tok(l_v))$. Lexical similarity can also be computed as an exact match, token match, etc. Vocabulary annotation may be performed automatically upon ingestion, and used subsequently to guide searching for data, integration and alignment of multiple data sources, and topic modeling for the generation of recommendations. The vocabulary annotation process generated an annotated model 327, which may be stored in the model store 330. In short, vocabulary annotation adds an annotation to a word that references another term. For example, a table may have label noted as "Patient", and the label may be linked to a term in the vocabulary, via an annotation, which defines that label. In this application, a vocabulary annotation may be generated for a source data model.

Semantic processing 328 follows model generation to expand the expressiveness and make explicit the axioms implied by the relationships between annotated terms. Semantic processing consists of an Ontology Normalizer, Inferred Axiom Processor, Metadata Updater and a UMLS tagger. The Ontology Normalizer processes Class and Property annotations and rewrites them using a standardized set of annotation axioms. Ontologies produced by different groups use varying properties for specifying textual information, which can complicate analysis. To overcome this, an initial processor is used to detect the source of the ontology, for instance through the presence of an OBO or NCI Thesaurus specific property. Depending on the detected type a specific processor branch will be triggered to normalize the text appropriately and store it into a normalized supplemental graph. Further processors can then access the textual information using this supplemental graph without needing to understand the differences in how they were originally encoded. The Inferred Axiom Processor loads the annotated model into an OWL-DL reasoner and uses it to produce all statements inferred by those contained within the uploaded model and store them within an "Inferred" supplemental graph. This allows the model store 330 to return the inferred statements without having to use an online reasoner, which can be a time intensive process. The Metadata Updater extracts the normalized ontology annotations and updates the metadata within the graph. The UMLS Tagger processes text within the normalized class and property annotations and links spans of text to concepts within the UMLS Metathesaurus. This provides extra sematic information that may be used for further understanding the ontology and to improve the sematic alignment of it with other ontologies.

The data loading process 323 performs the automated loading of the contents through conversion into a quad pattern and stored within a quad store 332, extending the typical mechanism of representing ontologies as triple patterns, comprising a subject, predicate, and object, to include three indices over all keys. Said quad store in some embodiments can be implemented within a relational database, in some embodiments can be implemented within a key-value store, and in some embodiments implemented within an Accumulo data store. The quad pattern indices are constructed by prefixing the row key with the type of index, followed by the first element of the quad in the appropriate index order, as illustrated in Table 2 below. These three indices are sufficient for efficiently matching the eight possible triple patterns. Data is read through standardized processes depending on the type of source, and is loaded as is, except for conversion of closed value domain values into identifiers to preserve referential integrity. In addition to this, provenance information regarding the user ingesting the data and the timestamp for ingestion will be automatically collected, and additional information regarding data ownership as well as a description of the data will be collected from the user and stored as properties within the ontology model.

TABLE 2

| Quad Pattern Indices | | | |
|---|---|---|---|
| | SPO Index | OSP Index | POS Index |
| Row | "spo_"<Subject> | "osp_"<Object> | "pos_"<Predicate> |
| Column Family | <Predicate> | <Subject> | <Object> |
| Column Qualifier | <Object> | <Predicate> | <Subject> |
| Value | <Context> | <Context> | <Context> |

The system may also provide mechanisms for continuous updating of raw data from external sources 322. For this case, the original ingestion of data provides mechanisms for users to specify the natural key of each table in the data set. The data profiling 326 component will be used to identify data fields that have unique values, which then constitute potential natural keys to be selected by the user.

With regard to semantic processing, raw data ingested into the system is seldom ready to use for analysis, and typically requires remodeling, curation, and integration to make it usable for different scenarios. The system provides users with tools to generate and define ad-hoc models 310 to be used for specific research tasks, and as detailed in the following.

With regard to semantic integration, the system provides mechanisms to assist users in discovering potential mappings from the different data sources existing within the system's distributed storage and the target models that need to be filled. For this purpose, it uses a version of the ASMOV ontology alignment algorithm (Y. R. Jean-Mary, E. P. Shironoshita, and M. R. Kabuka, "Ontology matching with semantic verification," *Web Semantics: Science, Services and Agents on the World Wide Web*, vol. 7, no. 3, pp. 235-251, September 2009), modified to incorporate the use of vocabulary annotations instead of direct lexical comparison, and to enable parallel computation to take advantage of cluster computing frameworks. The disclosed system may also use the ontology alignment algorithm used in co-owned U.S. Pat. No. 8,738,636 titled "Ontology Alignment with Semantic Validation" and which is hereby incorporated by reference in its entirety. The semantic processing step of the disclosed embodiments may be performed on multiple data models, as defined above, and may produce a target data model using the ontology alignment algorithm.

ASMOV processes classes and properties independently, and finds similarity measures for each class in one ontology with every other class in the other ontology, and similarly for properties. Let $M_i^c$ denote the state of the class matrix at the ith iteration, and $s_{abi}^c$ denote the calculated similarity of classes u and b at the ith iteration; then the ASMOV algorithm can be characterized as a function as follows:

$$s_{abi}^c=F(a,b,M_{i-1}^c)$$

An analogous equation can be derived for properties. The function F is the linear combination of three structural features (hierarchy, property relations, and value domain) with the lexical similarity feature. As shown, the similarity measure at the ith depends only on the values calculated at the (i-1)th iteration, and on the values of the entities being compared. The calculation is then parallelized by calculating each similarity independently, and reconstructing the matrix after all calculations are performed. The system may use this modified version of ASMOV to find potential matches for specific concepts taken from the system vocabulary, inserted into the system through a specified ontology, or created in an ad-hoc manner to enable the construction of a new, integrated data model 310.

With regard to resource discovery, the system allows users to build and execute data transfer processes, leveraging semantic integration and complementing it with functions that allow for the transformation of data and for the construction of more sophisticated data models. To enable data transfer, the system provides the ability to construct data models and transformations. Data models are constructed through the selection of concepts from the system vocabulary, from existing ontologies, from existing models, or by direct input. The system enables the automatic creation of data models from existing schemas, using the same procedures as those for data ingestion outlined in Table 1 above.

For the construction of transformations, the system will provide a suite of standard operations found in extract-transform-load systems, including the following types of operations:

Syntactic operations: concatenation and splitting of strings, arithmetic calculations, date/time operations.

Boolean conditions: equality checks, regular expression matching.

Programmatic operations: Javascript processing or processing through any other scripting, interpreted language such as R.

Structural operations: pivoting/un-pivoting (conversion of rows into columns or vice versa).

Semantic operations: substitution of values by ontology elements, conversion of codes.

Error handling operations: illegal or null value handling.

Execution of data transfer processes always involves transference of data. Transformations are defined between data models, enabling composition, that is, transformed data that is stored back in the distributed storage is immediately available for further transformation.

Access to data sources contained in the system from external applications is governed through a Representational State Transfer (REST) interface over an HTTP connection. Any data source identified through a data model is available for external access; thus, both raw ingested data and transformed data are made available, depending on security and access control policies. Identification of each source is achieved through the namespace assigned to its corresponding semantic model.

Export of data depends on the mechanism by which its model 310 has been created. If a model was imported from an external relational store, the system provides methods to perform loading and updating over the existing database. On the other hand, if the model was created within the system, users are provided with the ability to export this model into a set of SQL commands to create a relational schema. For single table models, export will also be allowed to delimited-value formats.

Semantic queries enable the retrieval of both explicitly and implicitly derived information based on syntactic, semantic and structural information contained in data. The process of semantic querying retrieves data that constitutes solutions to a query based on both the asserted information contained within the data set being queried, as well as on any inferences that can be derived from this information according to the logic formulism of the ontology-based data model that defines the data set. In our system, the user poses a query against a (source or target) data model (where in some embodiments, the query is created using the SPARQL query language, as described more fully below)). This query defines potentially complex conceptual entities (see below), and the semantic querying process retrieves the data instances that are either asserted to be members of these conceptual entities (concepts), or that can be inferred to be such members according to the Web Ontology Language, version 2 (OWL 2) specification With regard to semantic querying 312, data models created through the system are represented using the Web Ontology Language, version 2 (OWL 2), and as such are designed to enable the creation of potentially complex conceptual entities. For example, it is possible to build data models that contain information that consists of instances of ontology class A and ontology class B defined in some ontology within the system. If the ontology defines that both classes A and B are sub-classes of class C, as subclassing is defined in OWL 2, then retrieval of instances of class C also retrieves instances of classes A and B.

Performance of this kind of retrieval requires the use of ontology reasoning to infer the proper classification of data instances. Such reasoning, however, has exponential time complexity over fully expressive OWL ontologies such as Gene Ontology, and thus becomes infeasible for the volumes of data expected to be collected and processed.

To address this issue, novel mechanisms have been developed for massively parallel ontology reasoning on very large data sets, titled Enhanced Most-Specific-Concept (Enhanced MSC), first described in (J. Xu, P. Shironoshita, U. Visser, N. John, and M. Kabuka, "Optimizing the Most Specific Concept Method for Efficient Instance Checking," in *Proceedings of the Companion Publication of the* 23*rd International Conference on World Wide Web Companion*, Republic and Canton of Geneva, Switzerland, 2014, pp. 405-406) and expanded in (J. Xu, P. Shironoshita, U. Visser, N. John, and M. Kabuka, "Converting Instance Checking to Subsumption: A Rethink for Object Queries over Practical Ontologies," *International Journal of Intelligence Science*, vol. 05, no. 01, pp. 44-62, 2015). Enhanced MSC is based on the idea of a "most specific concept" (MSC) (F. Donini and A. Era, "Most specific concepts for knowledge bases with incomplete information," in *Proceedings of CIKM*, Baltimore, Md., USA, 1992, pp. 545-551), which converts instance checking to concept subsumption by extracting a concept that encapsulates what is known about a data instance in terms of the terminological box (TBox) of the ontology. Since the TBox is normally much smaller than the database itself, it is expected that this conversion results in much shorter reasoning time. And by eliminating any dependency for instance checking on other instances, instance retrieval can be made massively parallel. In the disclosed embodiment, semantic querying is executed on a target data model, using an ontology defined by said target model and using parallelized ontology reasoning, which may use the Enhanced MSC method.

This potential advantage is negated in the original MSC method, however, because the size of the most specific concept obtained for any given instance can be very large, often approaching the size of the database itself. The enhanced method applies a set of inexpensive syntactic checks on the MSC to ensure that its size remains small.

The following discussion assumes that the reader is familiar with Description Logics (DLs), the theory underpinning OWL 2 (see, F. Baader, D. Calvanese, D. L. McGuinness, D. Nardi, and P. F. Patel-Schneider, Eds., *The*

*description logic handbook: theory, implementation, and applications*. New York, N.Y., USA: Cambridge University Press, 2003). The enhanced MSC method only considers roles R such that there exists some $R' \sqsubseteq R$ and $$\exists R{\cdot}C_1 \bowtie C_2 \sqsubseteq C_3 \tag{1}$$

where $\bowtie$ stands for either $\sqcup$ or $\sqcap$, and $C_1$, $C_2$, and $C_3$ are potentially complex ontology classes. If a role (or property, in the parlance of OWL 2) is not involved in some axiom of the form of Eq. (1), then the role does not influence the classification of any individual and can be safely removed from consideration.

The Enhanced MSC method then retrieves instances of some (potentially complex) class Q from some ontology "K"=("T","A"), where "T" is the TBox and "A" is the ABox of the ontology, by inserting the query Q into "T", extracting the enhanced MSC for every individual o in "A", and then checking to see if $MSC(o) \sqsubseteq Q$. MSC(o) denotes the MSC of individual o, calculated. Since all MSC(o) are independent of one another, checks for all individuals can be performed in parallel, enabling their execution within a cluster infrastructure.

In some embodiments, the query is provided in the SPARQL query language for RDF, a query language standardized by the World Wide Web Consortium (W3C). A SPARQL query contains a graph pattern that defines the pattern that should be matched to retrieve query instances; a graph pattern is a composition of triple patterns and operators. To process this query, it is first converted to the semQA query algebra. The remainder of this discussion uses a particular operator notation, particularly the Join and Or operators. Note that the semQA algebra enables the substitution of the LeftJoin operator for equivalent graph patterns using only Join and Or.

With the substitution of the LeftJoin operator, a SPARQL query graph pattern G can be recursively defined as follows:

$$G = \begin{cases} \mathrm{Join}(G_1, G_2) \\ \mathrm{Or}(G_1, G_2) \\ t \end{cases} \tag{1}$$

where $G_1$ and $G_2$ are also graph patterns, and t is a triple pattern. Triple patterns to be processed by the system can be of two types, which are shown below in both SPARQL syntax and Description Logic (DL) syntax:

| Type | SPARQL Syntax | DL Syntax |
|---|---|---|
| Class assertion | n1 rdf: type A | $A(n_1)$ |
| Property assertion | n1 P n2 | $P(n_1, n_2)$ |

where A is an ontology class and P is an ontology role or property, and $n_1$ and $n_2$ are nodes, which can either be variables or ABox instances. Blank nodes in the SPARQL query are treated as variables. The SPARQL query is converted into a series of ontology classes, one for each variable in the query, using a variation of the MSC method. The MSC of a variable v with respect to a graph pattern is thus defined as follows (using DL syntax for triple patterns):

$$MSC(v, G) = \begin{cases} MSC(v, G_1) \sqcap MSC(v, G_2), & \text{if } G = \mathrm{Join}(G_1, G_2) \\ MSC(v, G_1) \sqcup MSC(v, G_2), & \text{if } G = \mathrm{Or}(G_1, G_2) \\ A & \text{if } G = A(v) \\ \exists P, MSC(n, G_2), & \text{if } G = P(v, n) \\ \exists P-, MSC(n, G_2), & \text{if } G = P(n, v) \end{cases} \tag{2}$$

If n is an ABox instance, $MSC(n, G_2)=MSC(n)$.

Once MSCs for all variables have been defined, these MSCs are used as query concepts in the method outlined above. Results for all variables mentioned in the graph pattern are calculated in this way.

Where the SPARQL query contains filters, the filters are applied during instance checking. Filter pushdown as detailed in the semQA query algebra is used to push these filters as far as possible into the query. Filtering is performed in standard fashion as indicated in the SPARQL standard. Other operators pertaining to a SPARQL query, including query forms, solution sequences, modifiers, and projections, are applied on the results after instance retrieval.

Figure 4:
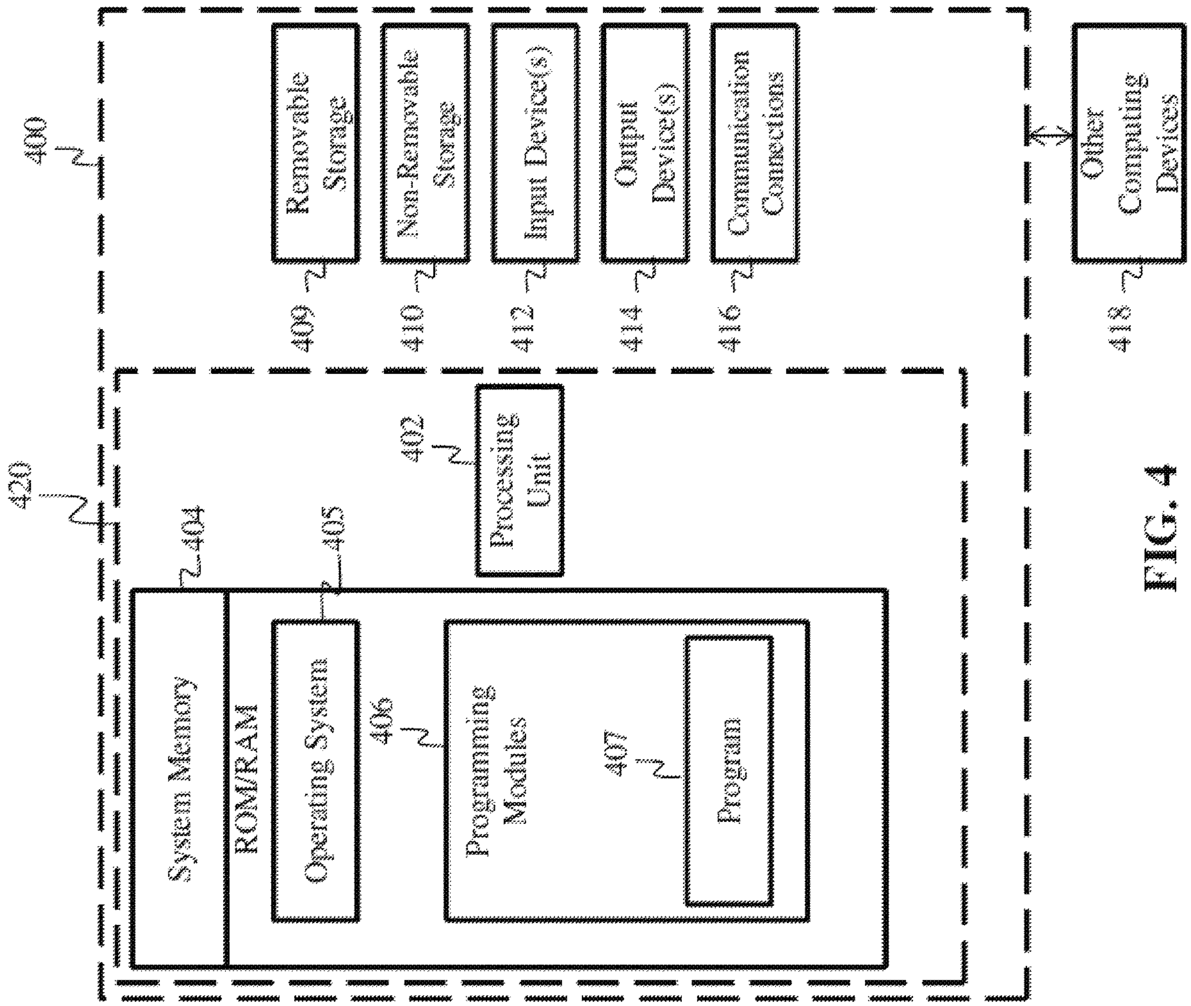
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 102 and servers 112 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for all or a portion of the processes, methods, control flows and data flows shown in FIGS. 2-3B above.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or nonremovable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules 406 and data files may be stored in system memory 404, including operating system 405. While executing on processing unit 402, programming modules 406 may perform processes including, for example, all or a portion of the processes, methods, control flows and data flows shown in FIGS. 2-3B above. The aforementioned processes are examples, and processing unit 402 may perform other processes. Other programming modules that may be used in accordance with embodiments presented herein may include electronic mail and contacts applications, word processing applications, spreadsheet applications, messaging applications, database applications, slide presentation applications, drawing or computer-aided application programs, etc.

Generally, consistent with embodiments presented herein, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments presented herein may also be practiced in distributed computing environments where tasks are performed by remote processing devices that are linked through a communications network. In a distributed computing environment, program modules may be located in both local and remote memory storage devices.

Furthermore, embodiments presented herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, are described above with reference to block diagrams and/or operational illustrations of methods, systems, and computer program products according to the disclosed embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the claimed subject matter have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented system comprising one or more hardware processors within a computational cluster for aggregating data from a plurality of heterogeneous data sets comprising at least one million data points or one gigabyte of data into a homogeneous representation within a distributed, fault tolerant data source for subsequent high-throughput retrieval, integration, and analysis of constituent data regardless of original data source location, data source format, and data encoding, the system comprising:

a) a quad store data persistence mechanism implemented on top of a distributed key-value store, wherein every data value within a data set is represented as a quad pattern, combining a standard triple pattern of subject, predicate, and object with a supplemental graph pattern cross-referencing subject-predicate-object, subject-object-predicate, and predicate-object-subject combinations for efficiently matching eight possible triple pattern combinations;

b) an optional set of data annotations consisting of Web Ontology Language (OWL) assertions that describe classes, datatype properties, and object property relationships that together describe a data set within the quad store;

c) a data ingestion mechanism to convert heterogeneous structured and semi-structured data sets into a homogeneous representation within said quad store, including a method for creating unique data set identifiers based on source data location and data access mechanism, a method for creating unique class and property identifiers from data set metadata, and a method for creating unique entity identifiers from occurrences of data values within the dataset, and storing said unique identifiers as annotations within said quad store, wherein said annotations consist of OWL assertions that describe the classes, datatype properties, and object property relationships that together describe the ingested data set; and d) a semantic querying component that applies an Enhanced Most-Specific-Concept (MSC) algorithm by identifying concepts satisfying a query within a terminology-box (TBox), represented as subject and predicate annotations within the quad store, then testing in parallel across all nodes within the computer cluster whether individual data entities, represented as subject-predicate-object annotations, within an assertion-box (ABox) are instances of said concepts, and combining the matching data entities from each node into a collection of triples, represented as subject-predicate-object annotations, representing a query result.

2. The system of claim 1, wherein the data ingestion mechanism is performed continuously from a source data set by selecting or specifying a natural key for each data entity in the quad store and utilizing the natural key to identify new data elements in the source data set to be added as data entities within the quad store.

3. The system of claim 1, wherein the semantic querying component is specified using the SPARQL query language.

4. The system of claim 1, wherein the semantic querying component may further involve transference of data from said quad store to a SPARQL-compliant serialization method including Turtle, Resource Description Framework (RDF), JavaScript Object Notation (JSON), Delimiter Separated Value (DSV), and Structured Query Language (SQL) Data Manipulation Language (DML).

5. The system of claim 1, wherein the semantic querying component may be optimized using semQA algebra.

6. The system of claim 1, wherein the semantic querying component may be performed against an ontology.

7. The system of claim 1, wherein a data profiling mechanism is used to generate a profile of the data within the quad store, wherein the profile discovers implicit data constraints, such as identifying the appropriate datatype representation for a data property, identifying categorical representations and discrete category values, identifying statistical features of the data source property such as mean, range, and standard deviation, and identifying implicit relationships between classes, and storing said data profile as annotations within said quad store, wherein said annotations consist of OWL assertions that describe the datatype and object property relationships that together describe the profiled data.

8. The system of claim 7, wherein the data profiling mechanism may be performed in parallel within the computer cluster by partitioning the quad store by subject, predicate, or object patterns, distributing each partition to a node in the cluster to perform data profiling, and storing the resulting profiles as annotations in said quad store.

9. The system of claim 1, wherein a vocabulary annotation component is used to probabilistically link data entities of the quad store to terms within one or more system vocabularies based on exact lexical match and a combination of word tokenization with lexical word match, word stemming, and word stemming with stop word removal, and storing said vocabulary annotations within said quad store, wherein said annotations consist of OWL assertions that describe datatype and object property relationships that together describe a calculated probability and target vocabulary term linked to each data entity.

10. The system of claim 9, wherein the vocabulary annotation component can be performed in parallel within the computational cluster by processing each data element within said quad store independently by nodes in the computational cluster and stored as annotations within said quad store.

11. The system of claim 1, wherein a semantic processing mechanism is used to normalize annotations within the quad store to rewrite class and property annotations using a standardized set of annotation axioms, and to identify and make explicit axioms implied by existing assertions stored within the quad store, such as synonyms, equivalent and disjoint concepts, and parent-child relationships, using a Description Logistics (DL) reasoner to identify all implied axioms, and storing said axioms as annotations within said quad store, wherein said annotations consist of OWL assertions that describe classes, datatype properties, and object property relationships that are constructed to represent normalized data entity and explicit axioms across all entities in the quad store.

12. The system of claim 11, wherein the semantic processing mechanism can be performed in parallel within the computational cluster by processing each data element within said quad store independently by nodes in the computational cluster and stored as annotations within said quad store.

13. The system of claim 11, wherein the semantic processing mechanism utilizes an ontology alignment algorithm to identify relationships between the data entities within the quad store and concepts within an ontology.

* * * * *